Patented Nov. 7, 1922.

1,434,469

UNITED STATES PATENT OFFICE.

ARTHUR V. WILKER, OF BEREA, OHIO, ASSIGNOR TO NATIONAL CARBON COMPANY, INC., A CORPORATION OF NEW YORK.

DEPOLARIZER FOR DRY CELLS.

No Drawing.   Application filed December 28, 1918.   Serial No. 268,725.

*To all whom it may concern:*

Be it known that I, ARTHUR V. WILKER, a citizen of the United States, residing at Berea, in the county of Cuyahoga and State of Ohio, have invented a certain new and useful Improvement in Depolarizers for Dry Cells, of which the following is a full, clear, and exact description.

This invention relates to improvements in dry cells and more particularly to catalyzers for depolarizers of dry cells.

As is well known, the so-called dry cell of commerce has a depolarizer of pyrolusite or artificial manganese peroxide either hydrated or not. While manganese peroxide has been found to be the most satisfactory depolarizer for practical use in dry cells, nevertheless it is somewhat sluggish in giving up oxygen for depolarization, and the recuperation after a short period of heavy service is rather slow.

It has heretofore been proposed to use ordinary mercuric oxide with manganese peroxide to improve its action, but the additional advantage has been found to be slight in practice. I have discovered that if freshly precipitated yellow mercuric oxide be mixed with manganese peroxide the activating effect on the latter is very remarkable. The manner in which the improved results are secured will now be described.

A solution of a mercury salt such as mercuric chloride, in water is kept in the dark while powdered manganese peroxide is stirred into it to form a sludge or suspension of oxide in the solution. When the particles are thoroughly suspended an alkaline solution such as the hydroxides of sodium or potassium, is added to cause the precipitation of the yellow mercuric oxide on the manganese peroxide particles and in the pores thereof. It is desirable to have the solution remain neutral and therefore the alkaline solution should not be added in large enough quantity to precipitate all of the mercury.

After the precipitation is completed the sludge is allowed to settle and the supernatant liquid decanted. The peroxide "mud" is then washed and filtered to remove the soluble material that should not go into the dry cell, and the depolarizer is then mixed with the desired amount of the usual electrolyte and the cell completed in the usual way. The amounts of the electrolyte and the proportion of peroxide and graphite or carbon with which it is mixed, form no part of this invention, and since the limits of such proportions are well known in practice, they need not be described.

I have found that when yellow mercuric oxide is freshly precipitated on the manganese peroxide and used in a dry cell, the catalytic action or activating effect is very greatly increased over and above what it would be if the usual red or black mercuric oxide were used. The depolarizing action is increased to such an extent that cells will stand much more rigorous service in practice without unduly lowering the terminal voltage; and after the rigorous service has ceased the cells almost immediately resume their normal characteristics. In other words, dry cells embodying my improvement have increased capacity for heavy service and possess great recuperative power on open circuit.

As is well known, zinc chloride, together with ammonium chloride, is commonly used as the electrolyte of a dry cell. If my improvement is used with zinc chloride as one of the electrolytes, the zinc tends to gradually precipitate as zinc oxide in the battery mix, and the mercury to go into solution as mercuric chloride. This will take place in the mix out of immediate reach of the zinc electrode of the cell, but the mercuric chloride will diffuse more or less through the bibulous lining and paste, to the zinc, which will amalgamate the latter through the plating out of the metallic mercury from its soluble salt. If this proceeds to any material extent, the zinc will be replaced by the mercury in such amounts as to harm the cell. The use of thicker zincs would compensate for this action, but I prefer to avoid this objectionable feature by replacing the zinc chloride of the electrolyte with other electrolytes such as calcium chloride or calcium acetate. Neither of these electrolytes will cause the mercury of the yellow mercuric oxide to go into solution, and they are otherwise satisfactory in the cell.

Since actinic light quickly acts on yellow mercuric oxide to change it over into the other allotropic forms, it is necessary to carry on the precipitation process in a room containing no actinic or blue light if the full advantage of the catalyzer is to be obtained. However, after the oxide is precipitated, washed and filter pressed, the resulting mass may be handled in the light without undue action. The product can be safely tamped into dry cells in the usual lighted rooms because only a small part of it will be affected by the light, the yellow mercuric oxide being precipitated in the pores of the manganese peroxide and substantially shielded from the actinic rays.

Obviously the yellow oxide of mercury may be mechanically mixed with manganese peroxide (in the dark) instead of precipitating it thereon. I also have precipitated it on the powdered lamp-black or coke used in the mix. There is no specific proportion necessary and I have obtained good results with 3% HgO and 97% $MnO_2$ by weight.

While the yellow mercuric oxide is preferably used with manganese peroxide in dry cells on account of the reduced cost, nevertheless it can be used alone as the depolarizer with excellent results, the only disadvantage being the increased cost.

The catalytic action of the yellow mercuric oxide is not confined to manganese peroxide. It can be used in alkaline cells employing copper oxide as the depolarizer, or in storage batteries in which lead peroxide is the active material. Likewise it can be used in alkaline types of storage batteries employing oxides or hydroxides of iron, nickel, cobalt, or calcium as active materials.

Having described my invention, what I claim is:

1. In an electric battery, the combination with an oxid depolarizer, of an activating agent comprising yellow mercuric oxid.

2. In an electric battery, the combination with a manganese dioxid depolarizer, of an activating agent comprising yellow mercuric oxid.

3. In an electric battery, the combination with an oxid depolarizer and an activating agent therefor, of an electrolyte containing a salt of an alkali earth metal.

4. In an electric battery, the combination with an oxid depolarizer and an activating agent therefor, of an electrolyte containing ammonium chlorid and a salt of an alkali earth metal.

5. In an electric battery, the combination with a manganese dioxid depolarizer and an activating agent therefor, of an electrolyte containing a salt of an alkali earth metal.

6. In an electric battery, the combination with a manganese dioxid depolarizer and an activating agent therefor, of an electrolyte containing ammonium chlorid and a salt of an alkali earth metal.

7. In an electric battery, the combination with an oxid depolarizer and an activating agent therefor comprising yellow mercuric oxid, of an electrolyte containing a salt of an alkali earth metal.

8. In an electric battery, the combination with a manganese dioxid depolarizer and an activating agent therefor comprising yellow mercuric oxid, of an electrolyte containing ammonium and calcium chlorids.

In testimony whereof, I hereunto affix my signature.

ARTHUR V. WILKER.